(12) United States Patent
Boyle (10) Patent No.: US 7,278,684 B2
(45) Date of Patent: Oct. 9, 2007

(54) RETRACTABLE COUPLING APPARATUS

(75) Inventor: Donald C. Boyle, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 10/688,174

(22) Filed: Oct. 16, 2003

(65) Prior Publication Data

US 2004/0084939 A1 May 6, 2004

Related U.S. Application Data

(60) Provisional application No. 60/419,216, filed on Oct. 16, 2002.

(51) Int. Cl.
*A47C 1/08* (2006.01)

(52) U.S. Cl. .............. 297/253; 297/250.1; 297/254

(58) Field of Classification Search ............... 297/253, 297/250.1, 254
See application file for complete search history.

(56) References Cited

U.S. PATENT DOCUMENTS

| 5,383,708 A | * | 1/1995 | Nagasaka et al. ..... 297/250.1 X |
| 6,017,087 A | * | 1/2000 | Anthony et al. ......... 297/250.1 |
| 6,209,957 B1 | * | 4/2001 | Baloga et al. ............. 297/253 |
| 6,767,057 B2 | * | 7/2004 | Neelis .................... 297/253 X |

* cited by examiner

*Primary Examiner*—Anthony D. Barfield
(74) *Attorney, Agent, or Firm*—Woodard, Emhardt, Moriarty, McNett & Henry LLP (57) ABSTRACT

An apparatus and method for mounting an add-on passenger restraint system to a vehicle seat is provided. The apparatus comprises a retractor affixed to the add-on passenger restraint system. An extension member extends between the retractor and a coupling member. The coupling member is configured to engage an anchorage attached to the vehicle.

4 Claims, 7 Drawing Sheets

RETRACTABLE COUPLING APPARATUS

This application claims priority to and the benefit of U.S. provisional patent application No. 60/419,216, filed 16 Oct. 2002.

BACKGROUND

The present invention relates to coupling devices and more specifically to a coupling apparatus for mounting a portable passenger restraint system or seat to a vehicle.

Various systems are used to mount add-on or portable passenger restraint systems to vehicles. For example, it is known to use a web belt attached to a child seat in combination with a connector to mount the child seat to a vehicle. Embodiments of such a combination, which may further include a web adjuster, are disclosed in commonly owned U.S. patent application Ser. No. 10/206,603 filed by Dingmans et al. on Jul. 26,2002 and now U.S. Pat. No. 6,962,394, and Ser. No. 10/245,983 filed by Foyer et al. on Sep. 17, 2002 and now U.S. Pat. No. 6,886,889 the disclosures of which are incorporated herein by reference.

A coupling apparatus and method for mounting an add-on passenger restraint system to a vehicle is provided. The vehicle without limitation may be a car, a bus, a watercraft, an aircraft, a van, a truck or any other type of vehicle. The add-on restraint system without limitation may be a portable infant or child seat, a portable booster seat, an animal carrier, or any other type of passenger restraint system. The illustrative coupling apparatus may mount a portable child seat in a forward, rearward or sideward orientation relative to the front end of the vehicle. The add-on restraint system may have its own restraint system, such as for example a seat belt system on a portable child seat, or walls to confine the passenger in the case of, for example, an animal kennel as disclosed in commonly owned U.S. patent application Ser. No. 10/411/836, the disclosure of which is now incorporated herein by reference. The add-on restraint system may also use the vehicle's restraint system, such as for example a car's seat belt system, to restrain the passenger. For example, the vehicle's seat belt system could assist the coupling apparatus described herein to mount the add-on passenger restraint system to the vehicle, and/or to directly restrain the passenger. The coupling apparatus illustratively comprises a retractor, a coupling member, and an extension member comprising opposing ends. One end of the extension member is attached to the coupling member and the other end is attached to the retractor. Illustratively, the retractor tends to withdraw therein the extension member. The retractor may be an automatic locking retractor that locks its spool against paying out or unwinding the extension member. The automatic locking retractor illustratively comprises a release member to unlock the spool and allow the extension member to be pulled out of the retractor. The coupling member illustratively may be an articulating connector, a snap hook connector, or any other suitable connector, such as for example a tongue configured to mate with or engage the vehicle's seat belt buckle, and/or a buckle configured to engage the vehicle's seat belt tongue. The coupling apparatus may conform with governmental standards, such as for example, FMVSS 213 and/or 225. The coupling apparatus may be configured to mount the add-on passenger restraint system to lower anchorages and/or upper anchorages in any combination. The coupling apparatus may be configured to engage lower anchorages using upper tether redirection system(s).

Features of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

An illustrative retractable coupling apparatus 30 is provided for use with an add-on passenger restraint system such as for example without limitation portable child restraint seat 20 and more specifically for mounting the add-on passenger restraint system to a vehicle seat 10 (FIGS. 1-6). Another illustrative retractable coupling apparatus 130 is also provided as best seen in FIGS. 7 and 8. Illustrative coupling apparatus 30 and illustrative coupling apparatus 130 operate in substantially the same manner. Accordingly, like elements are labeled with like numerals, and similar elements are labeled with similar numerals wherein the numerals for coupling apparatus 130 are incremented by 100 over the numerals used for coupling apparatus 30. Coupling apparatus 30, 130 is engageable by a user to releasably mount or attach the child restraint seat 20 to the vehicle seat 10 as will be described. The coupling apparatus 30, 130 is configurable for use with any manner of add-on passenger restraint system(s) such as for example without limitation a child restraint seat 20, a booster seat, an infant seat or the like, to mount any such add-on passenger restraint system to the seat(s) 10 of any manner of vehicle including for example without limitation a car, a van, a boat, a plane, a truck, a sport utility vehicle, a jeep, a bus, or other vehicle. The add-on passenger restraint system(s) may comprise its own passenger restraint system for use alone or in conjunction with the passenger restraint system integral to the vehicle. For example, in the case of an add-on child seat, the child seat may comprise a stand-alone restraint harness, which may for example be a five-point restraint system known to those skilled in the art. Such a child seat is mounted to the seat 10 as described herein, and without need to use the vehicle's seat belts. In contrast, for example, a booster seat may be mounted to the seat 10 as described herein with passenger restraint being provided by the seat belt system of the vehicle. Another example is found in an add-on passenger restraint system that is mounted to the vehicle as described herein without the use of the vehicle's seat belts, that carries its own restraint system, and that also uses the restraint system of the vehicle. Still another example is an add-on passenger restraint system that is mounted to the vehicle using a combination of the illustrative coupling apparatus and the vehicle's seat belt system, and restrains the passenger using the add-on system's restraint system alone or in combination with the vehicle's restraint system.

Referring to FIGS. 5-8, the coupling apparatus 30, 130 illustratively comprises a retractor 26, a flexible extension member or web 64 and a coupling member, which in the case of coupling apparatus 30 illustratively is an articulating connector 74, and in the case of coupling apparatus 130 illustratively is a snap hook connector 66. Illustratively, the flexible extension member is a length of web belt having opposing ends, although it could be a length of line, a length of cable, a length of rope, a length of plastic, a length of cloth or other suitable flexible or semi-flexible material.

Figure 1:
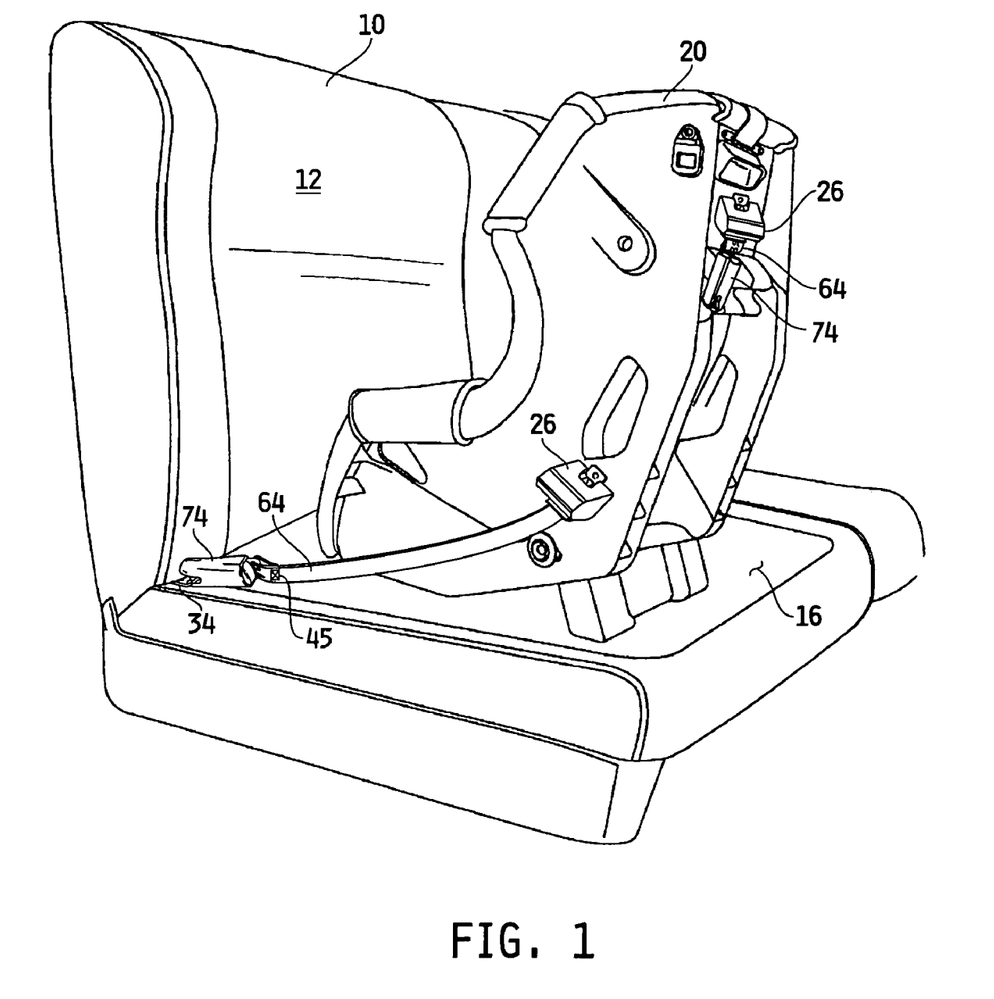
FIG. 1 is a perspective view of a portable child restraint seat configured with a plurality of illustrative retractable coupling apparatuses attached thereto wherein an illustrative lower coupling apparatus is depicted mounting to a vehicle seat the child restraint seat in a rearwardly facing orientation and an illustrative upper retractable coupling apparatus is depicted in a retracted and unengaged configuration.
Figure 2:
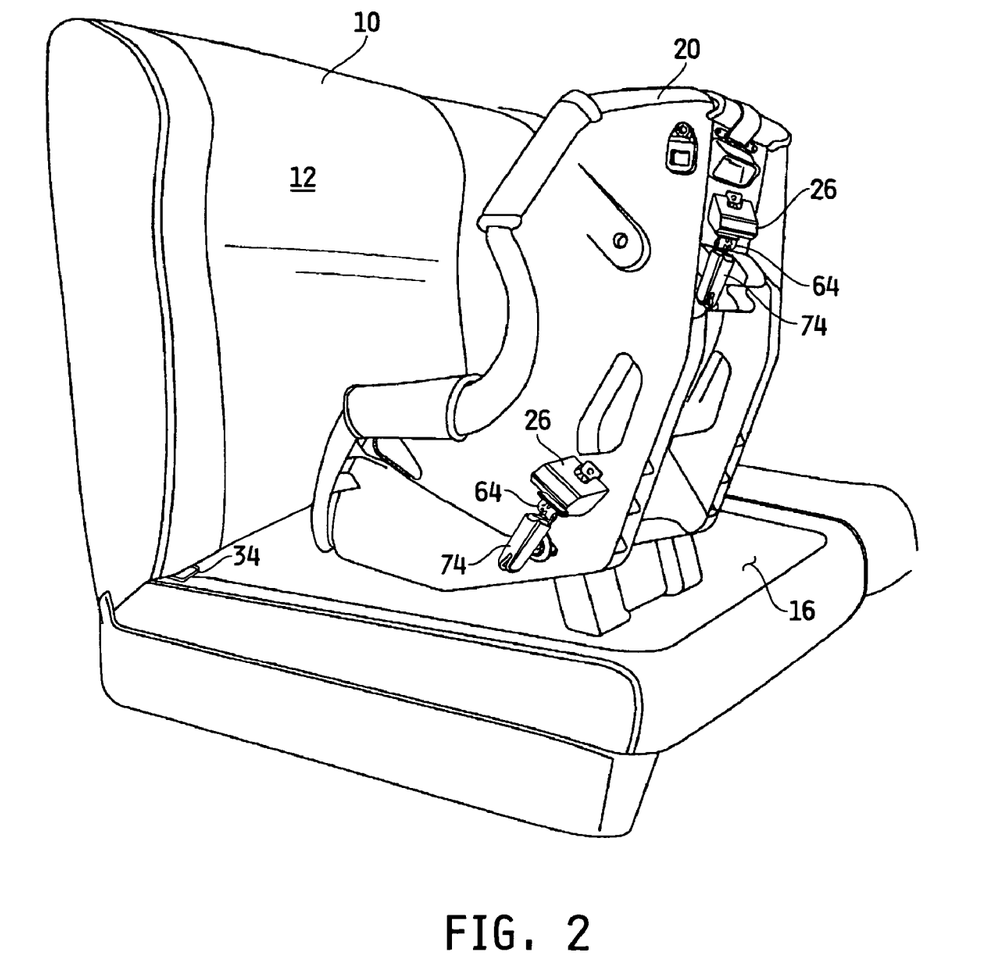
FIG. 2 is a perspective view of the portable child restraint seat of FIG. 1 wherein the illustrative coupling apparatuses are depicted in retracted and unengaged configurations.
Figure 3:
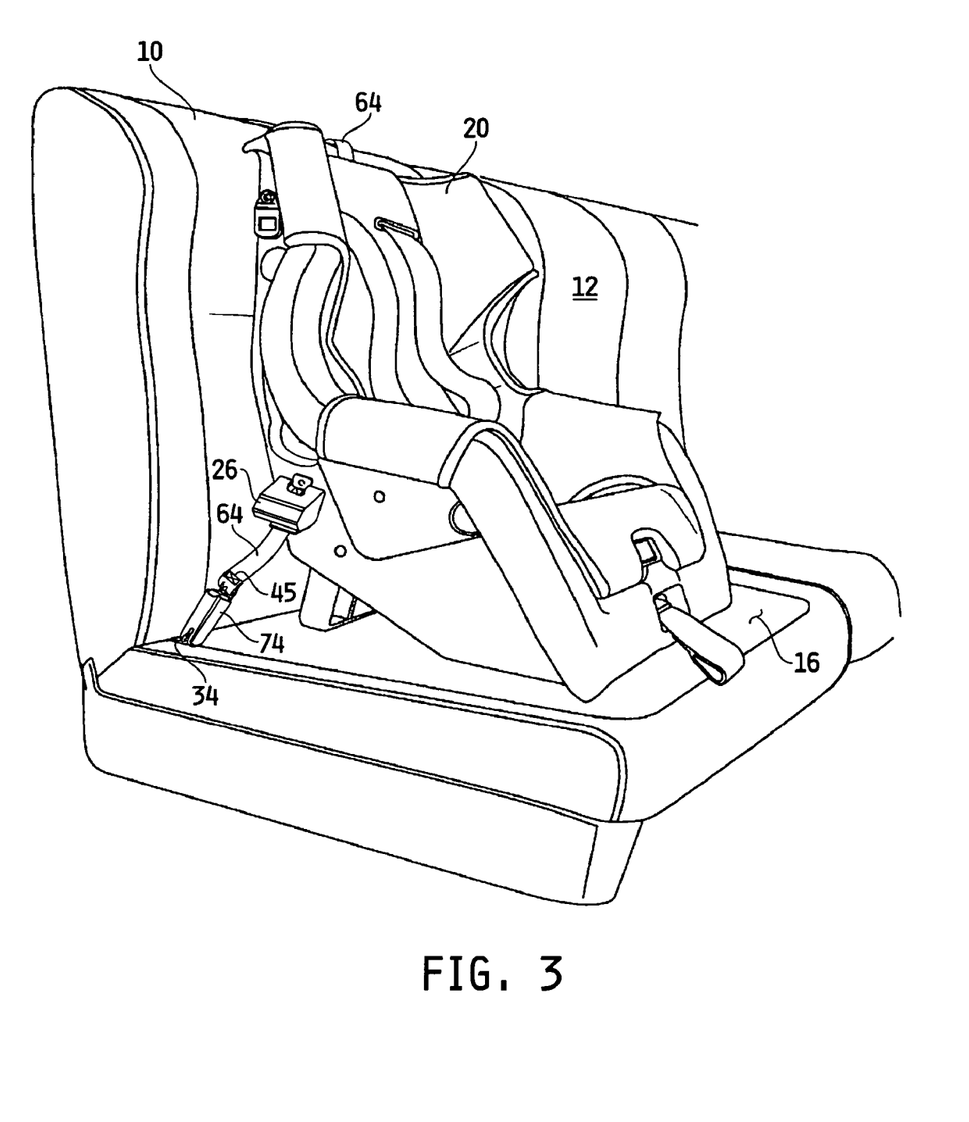
FIG. 3 is a perspective view of a portable child restraint seat configured with a plurality of illustrative retractable coupling apparatuses attached thereto wherein an illustrative lower coupling apparatus and an illustrative upper coupling apparatus are depicted mounting to a vehicle seat a child restraint seat in a forwardly facing orientation.

As seen in FIGS. 1-3, a vehicle seat 10, which comprises a back portion 12 and a seat portion 16, is depicted with a pair of spaced apart anchorages 34, which illustratively are rigid members or D-ring anchorages 34 mounted in the bight of the seat 10 between the back 12 and seat 16 portions. Such anchorages 34 may conform to certain standards set by private, local, state or federal bodies. For example and without limitation, the anchorages 34 may conform to Federal Motor Vehicle Safety Standard 225 ("FMVSS 225") codified at 49 C.F.R. § 571.225, which is incorporated herein by reference. FMVS 225 has mandated that child restraint anchorage systems be installed in most vehicles, including cars, trucks, and certain school buses. In addition to requiring two lower anchorages, FMVSS 225 requires an upper tether anchorage. All of the FMVSS 225 anchorages are of specified configuration, location and strength parameters. The anchorages 34 may be mounted in most any conventional manner to vehicle seat 10. Such anchorages are typically round in cross-section of which one example is an Anchorage World Universal 6-millimeter bar.

Similarly, 49 C.F.R. § 571.213 (FMVSS 213), incorporated herein by reference, specifies the dimensions of tether hooks used to attach a tether strap to an upper or tether anchorage (not shown). The connectors 66, 74 disclosed herein illustratively are configured to mount child seats 20 to vehicle seats 10 in accordance with 49 C.F.R. §§ 571.225 and 571.213. For example, an illustrative portable child restraint seat 20 is depicted in FIGS. 1-3 placed on the seat portion 16 of vehicle seat 10.

Illustratively, add-on seat 20 is coupled by at least one, or alternatively by two or more, connectors 66, 74 to lower anchorage(s) 34 with the web 64 tying or associating each connector 66, 74 to retractor 26, which in turn is affixed to a side portion of seat 20 as will be explained. Thus, the proximate end of web 64 is coupled to retractor 26 and the distal end of web 64 is coupled to connector 66, 74. For clarity, only one lower coupling apparatus 30 and corresponding connector 74 configured to engage lower anchorage 34 is shown in FIGS. 1-2. However, a second lower coupling apparatus 30 and corresponding connector 74, similar to the one that is shown, need not but may be affixed on the other side of seat 20 as seen in FIG. 3. In addition, an optional upper coupling apparatus 30 and associated connector 74 illustratively is affixed on the upper back side of the seat 20 for engagement with the upper tether anchorage (not shown). Alternatively, the upper coupling apparatus 30 may engage one of the lower anchorages 34 as will be explained. One or more coupling apparatus(es) 130 may similarly be mounted on a seat alone or in combination with another such apparatus 130 or in combination with apparatus 30 or other suitable coupling apparatus. It will be appreciated, therefore, that any seat 20 may be configured with, for example and without limitation, one lower coupling apparatus 30 or 130, with one lower coupling apparatus 30 or 130 and an upper coupling apparatus 30 or 130, with two lower coupling apparatuses 30 and/or 130, or with lower coupling apparatuses 30 and/or 130 and an upper coupling apparatus 30 or 130. Other combinations and permutations will be apparent to those skilled in the art. For example and without limitation, in the event that the child seat 20 is mounted to the vehicle seat 10 at one or more of the lower anchorages 34 or at the upper tether anchorage (not shown), any other suitable coupling apparatus, such as for example and without limitation those disclosed in the above incorporated references Ser. No. 10/206,603 filed by Dingman et al. and Ser. No. 10/245,983 filed by Foye et al.

The retractor(s) 26 are affixed to the seat 20 using any conventional coupling member, such as for example and without limitation a bolt, a pin, a rivet, stitching, hook and loops, a tack or other suitable method. Referring now to FIGS. 5-8, some of the features of one illustrative embodiment of the retractor 26 are shown. At one end thereof, retractor 26 includes a portion of a frame having or forming a mounting tab 67 which defines a mounting aperture 71 configured to receive a coupling member such as for example and without limitation a bolt or other suitable coupling member to mount or affix the retractor 26 to the seat 20 as seen in FIGS. 1-3. Extension member or web 64 illustratively has its proximal end connected to a known retractor mechanism (not shown) carried within the housing 68 of retractor 26, and has its opposing distal end extending from a mouth 73 formed in a retractor web guide 62. Retractor web guide 62 illustratively may be mounted to ears 61 by, for example and without limitation, pins 65 which may allow the web guide 62 to move thereabout. Alternatively, the web guide 62 may be immovable. In one embodiment, retractor 26 includes about 2-6 feet of retractable web 64, although it will be appreciated that retractor 26 may alternatively be configured to include more or less length of retractable web 64 as desired.

While the retractor mechanism carried by retractor 26 and connected to the retractable web 64 may be any known retractor mechanism, one example among many examples of a retractor suitable for use with retractable coupling assembly 30, 130 is described in U.S. Pat. No. 5,380,066, the disclosure of which is incorporated herein by reference.

Such an illustrative retractor 26 is an automatic locking retractor (ALR) 1.5 Cable-Actuated Retractor available from Indiana Mills & Manufacturing, Inc. under part number A30952. The retractor may be a single or a double automatic retractor system. Additional representative examples of suitable retractors are disclosed in U.S. Pat. Nos. 4,911,377; 5,497,956; 5,511,856; 5,560,565; and 5,779,319 the disclosures of which are all incorporated herein by reference. In any case, it may be desirable for the retractor 26 to be a positive locking retractor operable normally to restrict movement of the retractable web 64 relative to retractor 26 and to allow free movement of the retractable web 64 relative to the retractor 26 when a release is actuated as will be described. Moreover, the retractor 26 illustratively is operable to tend to urge or wind the extension member 64 inwardly into the retractor.

As an automatic positive locking retractor, the retractor 26 must be released by a release mechanism. For example, release member 69 (FIGS. 5-8) may be manually depressed by a user to release the retractor mechanism (not shown) to allow web 64 to unspool and pay out from the retractor 26 as seen in FIGS. 1 and 3 when the tendency of the retractor to wind in the extension member 64 is overcome. Illustratively, the release member 69 may be coupled to a retractor pawl (not shown) as is known to those skilled in the art. Alternatively, a cable (not shown) or other extension may be attached to and configured to actuate the release member 69 allowing the retractor mechanism to pay out web 64. A suitable release mechanism as just described, for example and without limitation, includes a cable web-pull assembly available from Indiana Mills & Manufacturing, Inc. under part number A30954.

Figure 4:
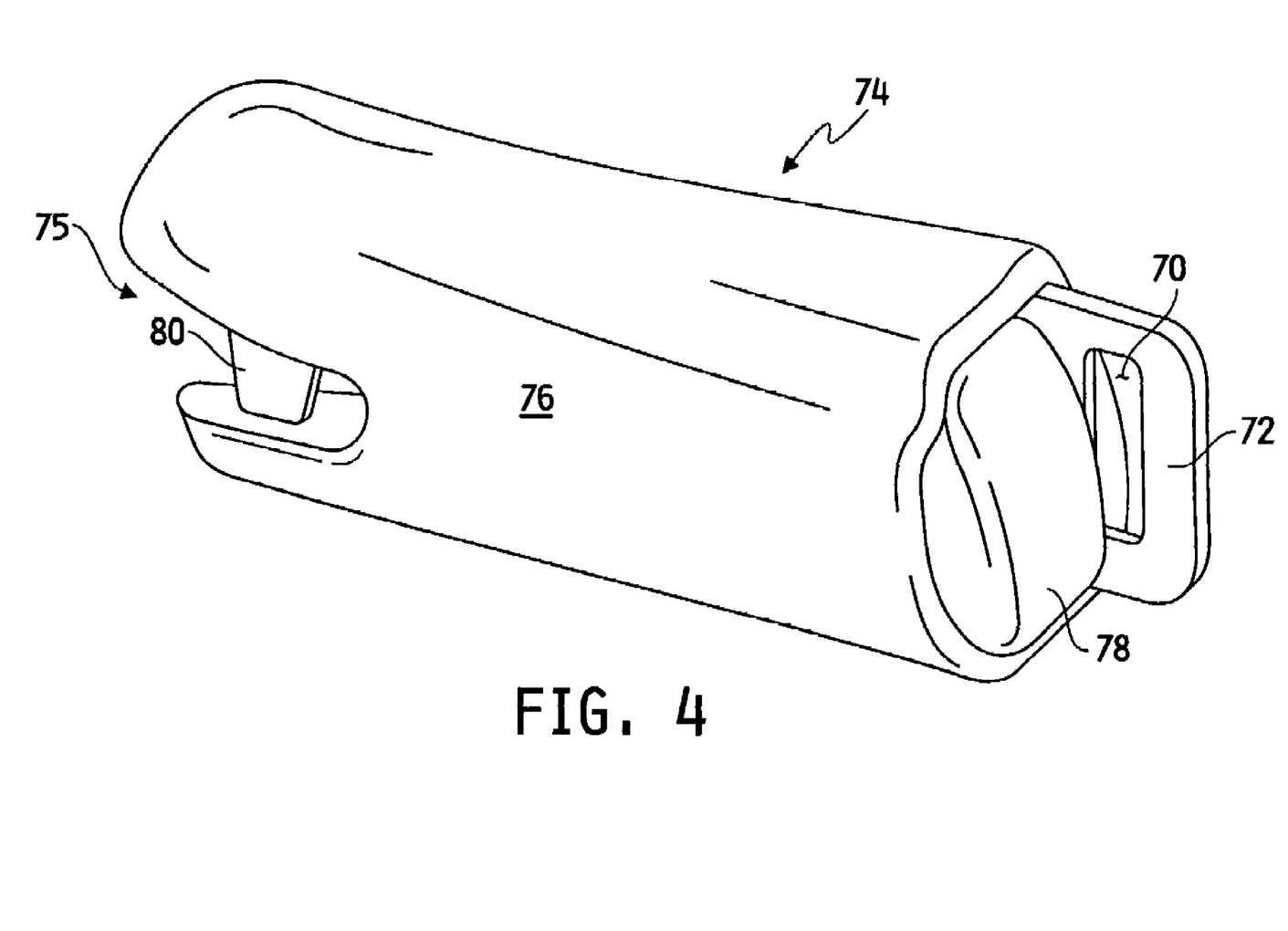
FIG. 4 is a perspective view of an illustrative embodiment of the connector portion of the illustrative coupling apparatuses depicted in FIGS. 1-3.
Figure 5:
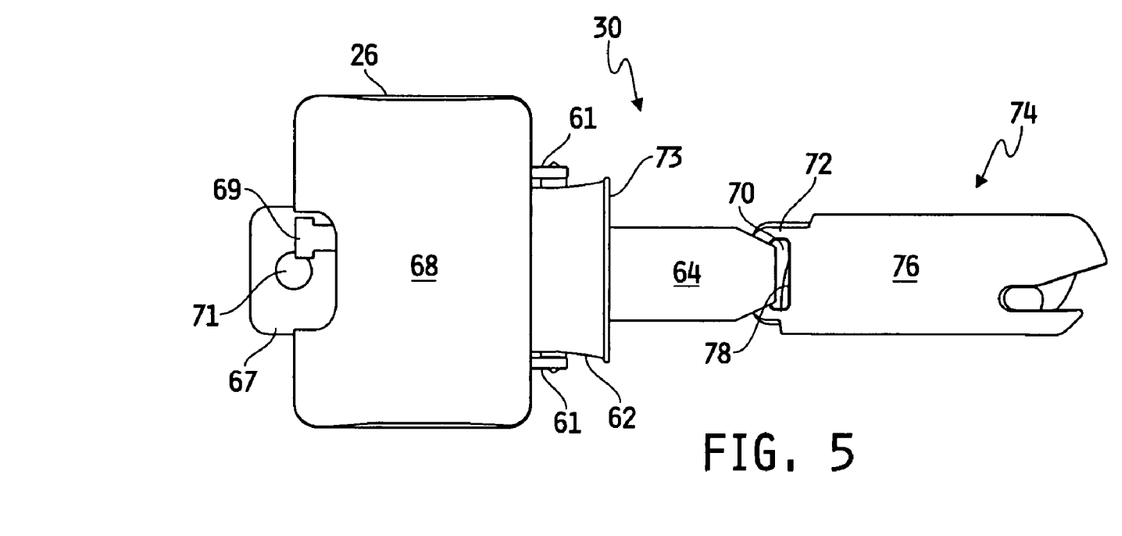
FIG. 5 is a diagrammatic top plan view depicting an illustrative embodiment configured with the illustrative connector portion depicted in FIG. 4.
Figure 6:
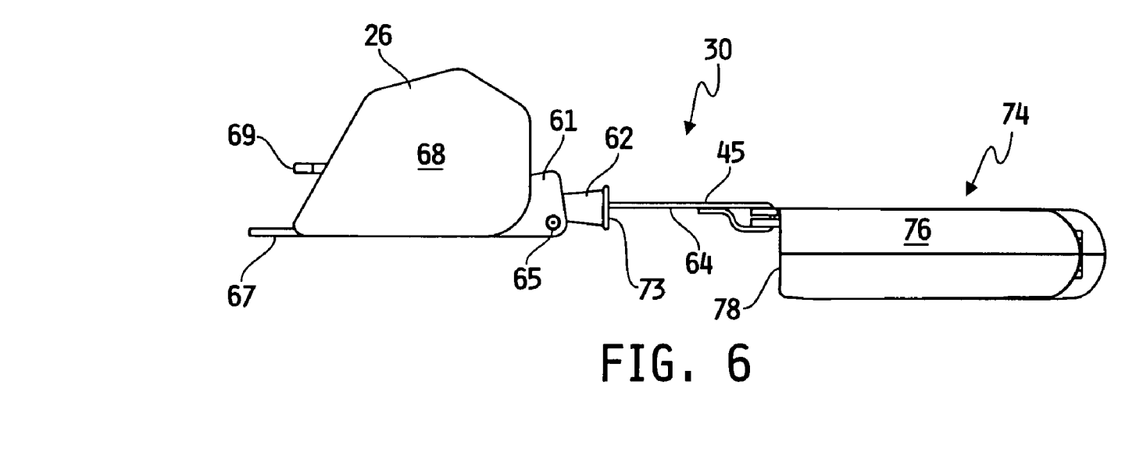
FIG. 6 is a diagrammatic side elevation view depicting the illustrative embodiment of FIG. 5.
Figure 7:
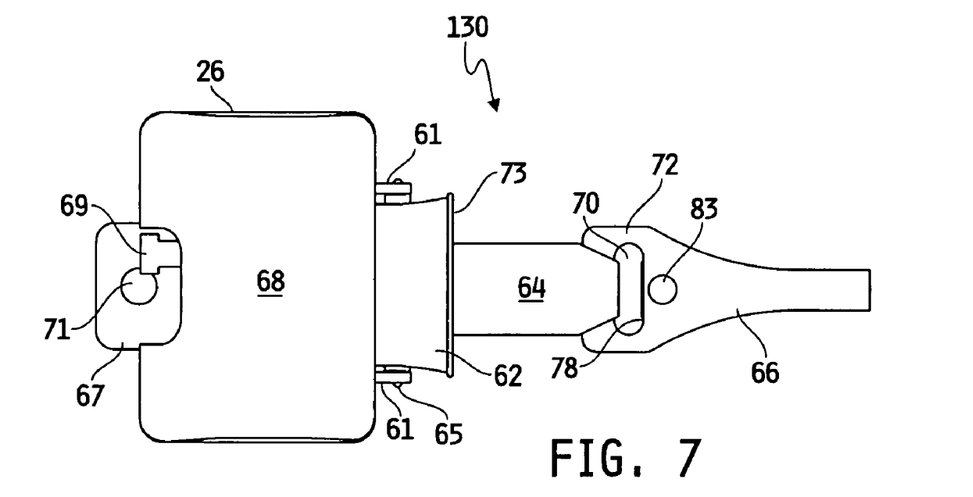
FIG. 7 is a diagrammatic top plan view depicting another illustrative embodiment configured with another illustrative embodiment of the connector portion.
Figure 8:
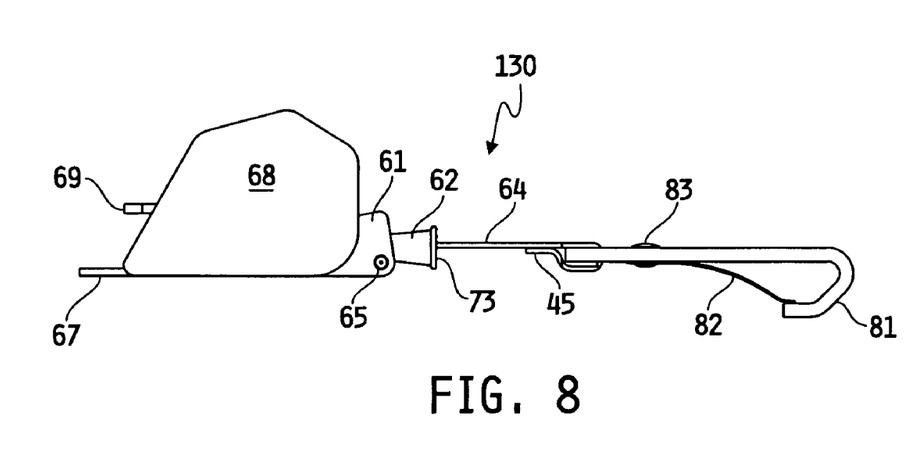
FIG. 8 is a diagrammatic side elevation view depicting the illustrative embodiment of FIG. 7.

Illustratively, in the embodiments depicted in FIGS. 1-8, the distal end of the retractable web 64 extends outwardly from the web guide 62 and loops back through a web anchor aperture or slot 70 formed in a frame portion 72 of couplers or connectors 66, 74 and illustratively is connected by stitching 45 or otherwise attached to the connectors 66, 74 as by snaps, hook and loops, rivets, melting and the like without limitation. FIGS. 4-6 depict an illustrative connector 74, which by way of example and without limitation is an articulating connector comprising the frame portion 72 at one end defining the web anchor aperture 70 sized to receive the looped portion of the retractable web 64 therein to thereby secure the articulating connector 74 together with the retractable web 64 as shown as previously described. Connector 74 illustratively includes a housing 76 defining a mouth 75 facing generally away from the slot 70 such that mouth 75 likewise faces generally away from the retractor 26 when mounted thereto as illustrated in FIGS. 5 and 6. Connector 74 further defines an articulating finger or jaw 80 disposed within the mouth 75, and an actuator 78 adjacent to the slot 70 for articulating the jaw 80 between open and normally closed positions. The mouth 75 is sized to receive therein the anchorage(s) 34 and/or upper tether anchorage (not shown) when the articulating jaw 80 is opened by depressing actuator 78. Illustratively, when the articulating jaw 80 is closed by releasing actuator 78 the anchorage 34 is trapped within the mouth 75 and inhibited by the closed jaw 80 from escaping mouth 75. It will be appreciated that pressing the leading edge of the finger 80 against the anchorage 34 will move the finger 80 into the open position and the finger will return to the closed position as the anchorage 34 passes under the finger 80 and seats in the mouth without need to depress or release the actuator 78.

While the present invention contemplates that connector 74 may be any known articulating connector without limitation, whether articulating or not, a number of embodiments of exemplary connectors suitable for use as articulating connector 74 are described in the already incorporated and co-pending U.S. application Ser. No. 10/206,603, as well as in co-pending U.S. applications Ser. Nos. 09/472,258 and 60/307,899, the disclosures of which are each incorporated herein by reference.

FIGS. 7-8 depict an alternative connector 66. Snap hook connector 66 comprises a hook portion 81 and a spring or keeper portion 82 attached by coupling 83, which may, for example and without limitation, be a rivet, a screw, a bolt, or other conventional coupling. Hook portion 81 and keeper 82 are configured as already noted to cooperatively and releasably engage anchorages 34, such as a round bar or D-ring, and/or upper tether anchorages, in a conventional manner well known to those skilled in the art.

The connector 74 and 66 described herein and the other connectors and couplers described in the incorporated references are illustrative in nature only; it being understood that any other suitable conventional connector without limitation may be used with retractable coupling apparatus 30 or 130.

In operation, a child seat 20 is placed on the seat portion 16 of any vehicle seat 10 either in a rearwardly facing direction (FIGS. 1 and 2), wherein the child seat 20 is facing toward the vehicle seat back portion 12 opposite the normal forward direction of the vehicle, or in a forwardly facing direction (FIG. 3). It may be possible to also place the add-on seat 20 in a sideward orientation (not shown) with one side adjacent to the back portion 12. In the rearwardly facing orientation, (FIGS. 1 and 2) the release member 69 is depressed to allow web 64 to pay out and the connector 74, 66 to be engaged with the respective lower anchorage 34. When the coupler 74, 66 is so engaged, the release member 69 may be released such that the retractor mechanism returns to the normally locked and biased position in which the retractor tends to urge the spool to take up any excess slack in the paid out web 64. The process may be repeated for the other side if a retractable coupling apparatus 30, 130 is mounted to the other side of the seat 20. If not, then a conventional coupling apparatus, which may be equipped with a web adjuster for manual adjustment of the operable length of the associated web, may be engaged with the anchorage 34 on the other side, such as for example as disclosed in co-pending U.S. patent application Ser. No. 10/206,660 filed by Woodard et al. on Jul. 26, 2002, the disclosure of which is incorporated herein by reference. In addition, tongue and buckle couplings or other conventional couplings could be utilized with the retractor 26. It will be appreciated that the release member may be configured to remain in the un-biased condition after actuation of release member 69 until such time as positively returned to the biased condition to wind in the web. As a further alternative, the retractor 26 could operate such that it is in an unlocked and unbiased condition allowing the web 64 to be withdrawn and the connector 66, 74 to be engaged with the anchorage 34 and thereafter the retractor could be actuated to reel in the web. In any event, it may be desirable for the web 64 to be further tightened through a manual tightening mechanism such as is disclosed in commonly owned U.S. patent application Ser. No. 60/477,901, filed 12 Jun. 2003, the disclosure of which is now incorporated herein by reference.

Referring to FIG. 3, for a forwardly facing child seat 20, the above process is repeated for the one or two lower retractable coupling apparatus(es) 30, 130, and/or one or two lower conventional coupling apparatus(es) (not shown), and/or the upper retractable 30, 130 (FIGS. 1-3) or conventional coupling apparatus (not shown), with the upper connector 66, 74 engaging the upper tether anchorages (not shown).

It will be appreciated that the connectors 66, 74 and retractor 26 may be made of any suitable metallic, non-metallic or composite material such as for example without limitation zinc, steel, plastic, titanium and the like by any method of manufacture suitable to the material used such as for example injection molding, die casting, stamping, and the like without limitation.

It is within the understanding of those skilled in this art, that each of the described illustrative embodiments may be used, not only to mount a child seat to a vehicle, such as, for example, a car, a van, or a bus, wherein any such vehicle has at least one rigid member mounted in the bight of the seat between the seat's seat and back portion, but also may be adapted to secure one or more straps to any anchor member, such as, for example an anchor member mounted to the floor of a vehicle, in order, to restrain a pet, or some cargo. In addition, they may be used to secure a restraint harness to one or more anchor members.

Figure 9:
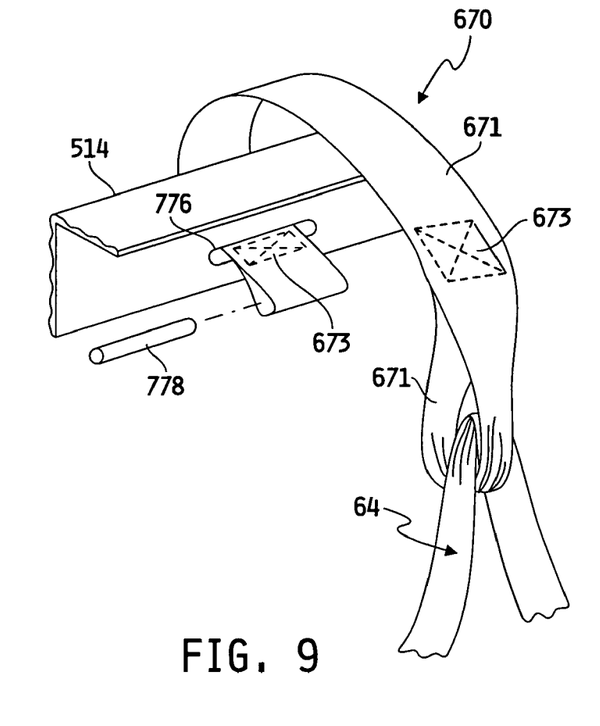
FIG. 9 is a perspective view depicting an illustrative web path-altering device.

Furthermore, it is possible to mount a forwardly facing child seat 20 using an upper retractable coupling 30, 130 as herein described above, but using the lower anchorages 34 rather than upper tether anchorages (not shown). Such an arrangement might be desirable in a vehicle, such as a bus, that does not have an upper parcel shelf. Referring to FIGS. 9-12, illustrative upper tether anchorages or mount systems 670, 770, 870, 970 are depicted. Illustratively, the upper tether mount systems or anchorages 670, 770, 870, 970 are mountable to a seat back frame 514 of a vehicle and alter or redirect the direction of a web 64 in substantially the same manner using either a loop of web 672 or a D-ring 680, or other suitable device. For example, the upper tether systems 670, 770, 870, 970 may receive a tether strap or web 64 proceeding upwardly from a portable child restraint system or seat 20 and redirect the upward path of said web 64 downwardly toward one of the lower anchorages 34 for coupling therewith in substantially the same manner as shown in FIGS. 9 and 11. In such a case, the lower anchorage 34 will transfer loads from the tether strap 64 to the vehicle structure. It will be appreciated that the tether 64 could also be routed through an upper tether anchorage (not shown) and downwardly to the lower anchorage 34 for anchoring.

The illustrative tether anchorage systems 670, 770, 870, 970 will now be described. Illustratively, upper tether system 670 comprises a length of web 671 formed into a routing loop 672 at one end by doubling one end of the web 671 back on, and coupling it to, itself as by, for example, stitching 673 (FIG. 9). The other end of the length of web 671 is mounted or attached by any suitable method to the seat back frame 514. One illustrative method of mounting the tether system 670 is by stitching. For example, the other end of web 671 could have a loop formed by stitching (FIG. 9) and configured to receive a retaining member 778. The web 671 could be threaded through aperture 776 in top crossbar member 514 and then coupled thereto by inserting the retaining member 778 through the loop as depicted in FIG. 9. It will be appreciated that system 670 and each of the other illustrative tether mount systems 770, 870, 970, which will now be explained, may use other suitable mounting methods.

Figure 10:
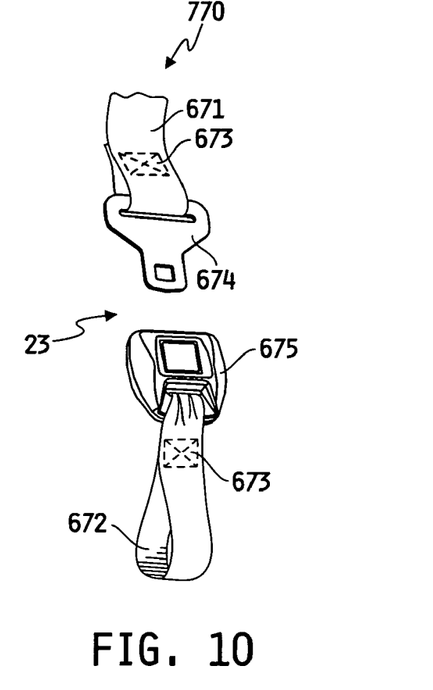
FIG. 10 is a perspective view depicting another illustrative web path-altering device.
Figure 11:
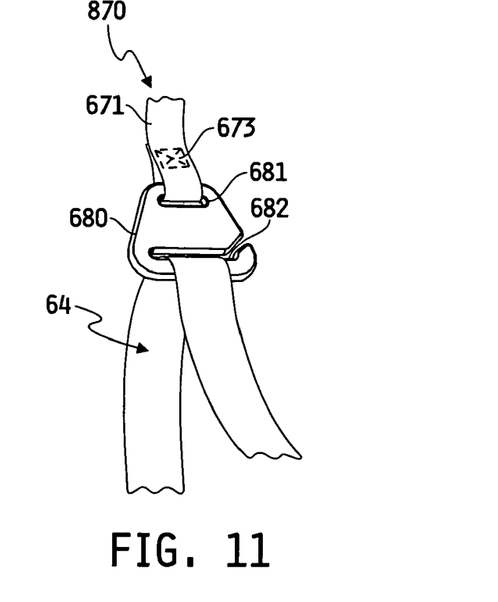
FIG. 11 is a perspective view depicting another illustrative web path-altering device.

In another illustrative embodiment, upper loop tether system 770 comprises a length of web 671 coupled at one end to a metal latch plate or tongue 674 (FIG. 10). The upper tether mount system 770 further comprises a buckle 675 and a web loop 672 coupled to said buckle 675 as by, for example, stitching 673. The tongue 674 and the buckle 675 are configured for releasable engagement with each other. The other end of the length of web 671 is attached to the seat back frame 510 by any suitable method, such as for example the already explained retaining member 778. The tether 64 is routed through upper tether mount system 770 in the same manner as with tether system 670.

Referring to FIG. 11, another illustrative upper tether anchorage system 870 comprises a length of web 671 coupled at one end to a metal D-ring 680. D-ring 680 is formed to include an open-ended web routing aperture 682 and a web mounting aperture 681, through which the web 671 is threaded and looped back on itself to couple the web 671 and D-ring 680 together by, for example, stitching 673. The web 64 is routed through the aperture 682 to direct its path downwardly for coupling with the lower anchorage 34. The other end of web 671 is mounted to seat back frame 510 by any suitable method, such as for example the already explained retaining member 778.

Figure 12:
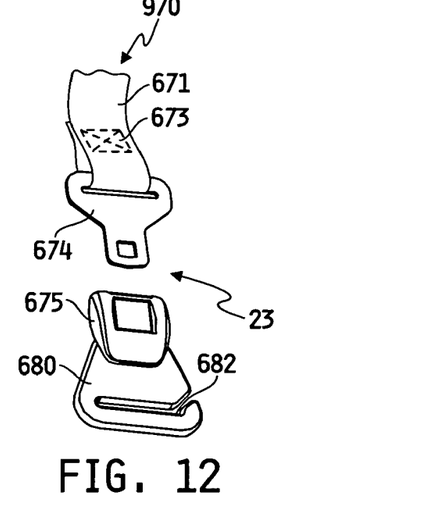
FIG. 12 is a perspective view depicting another illustrative web path-altering device.

Another illustrative embodiment is depicted in FIG. 12. Upper tether anchorage system 970 illustratively comprises a length of web 671 coupled at one end to a metal latch plate or tongue 674. The upper loop tether system 970 further comprises a metal D-ring 680 coupled to said buckle 675 as by, for example, rivets, it being appreciated that an intervening web (not shown) could couple the buckle 675 and the D-ring 680 together, as by, for example, stitching. D-ring 680 is formed to include an open-ended web routing aperture 682 through which a web, such as web 64 (FIG. 11), is routed in order to change the direction of any such web 64. The tongue 674 and the buckle 675 are configured for releasable engagement with each other. The other end of the length of web 671 is attached to the seat back frame 510 by any suitable method, such as for example stitching.

It will be appreciated that the D-ring 682 may be made of any suitable metallic material, such as die-cast from zinc or stamped from steel, and that it may be overmolded with another material, such as plastic, to protect any web, such as tether 27 or the below explained web 64, from sharp edges. Alternatively, the D-ring 682 may be fashioned out of any suitable metallic, non-metallic or composite material or combination thereof. Each of the couplings and attachments mentioned above in conjunction with systems 670, 770, 870, 970 could be accomplished using not only the illustrative retaining member 778 already described, but also any suitable method including, for example, rivet, screw, nail, glue, stitching or melting.

Although the invention has been described in detail with reference to certain embodiments, it should be understood that the invention is not limited to the disclosed embodiments. Rather, the present invention covers variations, modifications and equivalent structures that exist within the scope and spirit of the invention and such are desired to be protected. In addition, all examples are meant to be illustrative rather than restrictive in nature or limiting in any way.

The invention claimed is:

1. A coupling apparatus for mounting an add-on passenger restraint system to a vehicle seat having an anchorage, the coupling apparatus comprising:
   a retractor affixed to the add-on passenger restraint system,
   a coupling member for coupling to an anchorage,
   an extension member having opposing ends wherein one end is attached to the retractor and the other end is attached to the coupling member;

wherein the coupling member comprises an articulating connector configured to engage the anchorage, said articulating connector includes a housing with a mouth opening toward the anchorage and further includes an articulating jaw disposed within said mouth being moveable between an open position and a closed position whereat it engages the anchorage.

2. A coupling apparatus for mounting an add-on passenger restraint system to a vehicle seat having an anchorage, the coupling apparatus comprising:

a retractor affixed to the add-on passenger restraint system, a coupling member, an extension member having opposing ends wherein one end is attached to the retractor and the other end is attached to the coupling member, the coupling member being configured to engage the anchorage;

wherein the coupling member includes a frame with a mouth having a seat configured to receive said anchorage, said coupling member further includes a lever movably mounted to said frame with an end, said end includes a finger and an engagement portion with said end extending beyond said seat, said lever has a normally closed position wherein said finger substantially covers said mouth and an open position wherein said finger is substantially removed from said mouth, said coupling member further includes a stop member and a biasing member, said stop member being configured to normally engage said engagement portion to resist the movement of said lever from said normally closed position to said open position, said biasing member acting between said frame and said lever, said biasing member normally urging said stop member and said engagement portion into engagement.

3. A coupling apparatus for mounting an add-on passenger restraint system to a vehicle seat having an anchorage, the coupling apparatus comprising:

a portable child seat, a retractor affixed to the portable child seat, an extension member comprising a first end and an opposing second end, the first end being attached to the retractor, and a coupling member attached to the second end of the extension member, wherein the coupling member is configured to engage the anchorage, said coupling member including a housing with an articulating jaw being moveable between an open position and a closed position where at it engages the anchorage; and;

wherein the coupling apparatus is configured to thread upwardly through an upper tether redirection system attached to the vehicle proceeding downwardly away therefrom to mate with the anchorage.

4. A coupling apparatus for mounting an add-on passenger restraint system to a vehicle seat having an upper anchorage and a lower anchorage, the coupling apparatus comprising:

a portable child seat, a first retractor affixed to said child seat;

a upper tether having a first end attached to said first retractor affixed to the child seat and a second end having a connector configured to engage the upper anchorage, a second retractor affixed to the portable child seat, an extension member comprising a third end and an opposing fourth end, the third end being attached to the second retractor, and a coupling member attached to the fourth end of the extension member, wherein the coupling member is configured to engage the lower anchorage.

* * * * *